GERALD W. KINZELMAN,
INVENTOR.

BY Harry M. Saragovitz, Edward J. Kelly, Herbert Berl & J. P. Edgerton

Gerald M. Kinzelman
Inventor.
By: Harry M. Saragovitz,
Edward J. Kelly,
Herbert Berl &
J. P. Edgerton 3,339,084
Patented Aug. 29, 1967

3,339,084

MAGNETIC CORE LOGIC CIRCUIT

Gerald W. Kinzelman, Washington, D.C., assignor to the United States of America as represented by the Secretary of the Army Filed Apr. 8, 1963, Ser. No. 271,526
5 Claims. (Cl. 307—88)

ABSTRACT OF THE DISCLOSURE

An apparatus for electrically switching the mode of operation of a fuze utilizing magnetic core logic circuits is described. Bistable square loop selection cores are preset to one of their two stable states and act as switches. A counter circuit also using bistable magnetic cores is connected to each of the selection cores and as the counter counts past the point at which a selection core is connected, the selection core may produce an output depending upon what signal has been placed into the core. Further, a selection device is described, also using magnetic cores, which is designed to respond to an environmentally produced signal after the counter has reached a certain point, but will, if an environmental signal is produced as a result of a malfunction or is produced prematurely, revert to strictly time responsive operation.

The invention described herein may be manufactured and used by or for the Government of the United States of America for governmental purposes without the payment to me of any royalty thereon.

This invention relates to magnetic core logic circuits and more particularly to magnetic core logic circuits wherein selection may be made between a number of possible modes of operation by means of electrical inputs to certain magnetic cores.

In fuzing applications it is often desirable to be able to select one of a number of possible programs or modes of operation which the fuze is capable of performing, shortly before the missile is fired. Due to the severe ambient conditions and also high reliability required, it is desirable that the programing be accomplished without moving parts. Further, it is desirable that after one mode of operation has been selected, the fuze be capable of switching to another mode of operation to meet conditions which develop in flight.

It is, therefore, an object of the present invention to provide a novel magnetic core logic circuit which can function as a no-moving-part electronically operated switch.

Another object of the present invention is to provide a novel magnetic core logic circuit wherein the output is governed by history and sequence of the inputs.

A further object of the present invention is to provide a novel fuze circuit wherein any of a plurality of fuze programs, or modes of operation, may be selected electronically, and without moving parts.

A still further object of this invention is to provide a novel fuze circuit which, by means of electronic inputs, allows any of a plurality of programs or modes of operation to be selected, and which will also allow the mode of operation to be automatically changed while in flight if conditions encountered dictate a change.

These and other objects of the present invention are achieved by means of bi-stable square-hysteresis-loop magnetic-core logic circuits. The magnetic structures used for these square-loop logic schemes to be discussed are either sintered ceramic ferrites, or are built up of thin tape magnetic materials. Both classes of material possess a flux versus magnetomotive force characteristic which is essentially square, giving two stable conditions. In accordance with the teaching of this invention square loop selection cores are pre-set to one of their two stable states and act as switches. A counter circuit is connected to this selection core and as the counter counts past the selection core, the selection core produces an output depending upon what input had been placed into the core. In fuze applications a plurality of selection cores may be used, and additional cores are provided to change the state of certain of these selection cores in flight under pre-selected circumstances.

The specific nature of the invention, as well as other objects, uses and advantages thereof, will clearly appear from the following description and from the accompanying drawing, in which.

Figure 1:
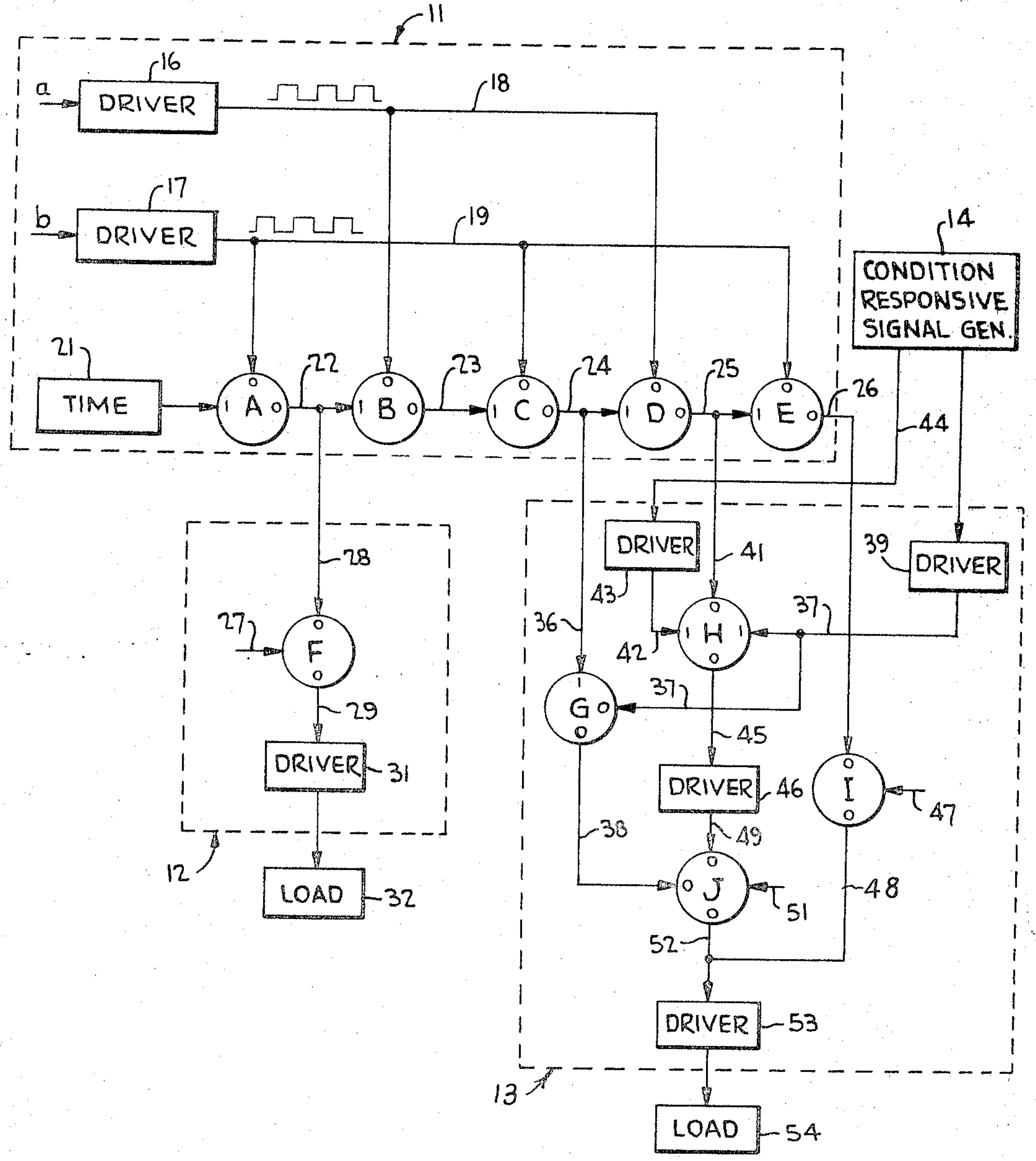
FIG. 1 is a logic diagram of an embodiment of this invention.

Referring to FIG. 1, there is shown a logic diagram of a fuze embodiment of this invention. The circles A,B,C, etc., represent bi-stable magnetic core devices. Conventionally one stable state is referred to as the "0" state and the other stable state is referred to as the "1" state. An arrow pointing to the core represents an input to that core, and an arrow pointing to a "1" indicates that an input tends to drive the core to the "1" state. Conversely, if the arrow points to a "0" it is indicated that that input will tend to drive the core to the "0" state. An arrow leading away from the core indicates an output, and if the arrow leads away from a "0" it is indicated that an output is obtained when the core changes from the "1" state to the "0" state. Where no "1" or "0" is shown at an input to the core it is indicated that the input is selectable and such input may drive the core to either of its two stable states.

The fuze circuit of FIG. 1 consists of several main components: a standard bi-stable counter circuit 11, selection switch circuits such as indicated by 12, a mode selection unit 13, and an environmental signal generator 14.

Any of a number of well known bi-stable registers or counter schemes may be used for the counter 11. Especially well suited for the use as a counter 11 is the driver and magnetic storage device scheme shown in the copending application of Ira Marcus, Ser. No. 218,185, filed Aug. 20, 1962, now U.S. Patent No. 3,268,736.

As in the Marcus application, the counter 11 consists of a series of cores A, B, C, D, E, and connected to the cores by drive leads 18, and 19 are drivers 16 and 17. The drivers 16 and 17 put out an alternating series of unidirectional drive pulses in response to a series of equally spaced timing pulses received at *a* and *b*. The cores A through E are initially set to the zero state so that initially the driver pulses have no effect. After a predetermined time, a timer 21 produces an output signal which switches the first core A to the "1" state. The succeeding drive pulse supplied over drive line 19 switches the core A back to the zero state, and this switching from the "1" to the "0" state produces an output on line 22 which switches the core B to the "1" state. The next drive pulse on line 18 switches the core B back to the "0" state producing an output on line 23 which switches the succeeding core C. The process is repeated until an output is produced on the output line 26 of core E.

Selector 12 is representative of any number of similar units which maybe used to control various functions in a projectile. It consists of a bi-stable core F, an input selection lead 27, a second input lead 28 connected to the counter 11, and an output lead 29 connected to a driver circuit 31. The output of the driver circuit 31 is used to control any desired load circuit 32. In his manner the selection lead 27 controls the load 32 in the manner of a no-moving-part electronic switch. Assume, for example, the input over selection lead 27 is of such polarity to set the core F to the "1" state. When the "1" is transferred from core A to core B in counter 11 a pulse appears on lead 28 of such polarity as to drive the core F to the "0" state. Since the core had been in the "1" state, as it switches back to the "0" state an output appears on line 29 which is applied to driver circuit 31 which is connected to a load 32. In the alternate situation, if the pulse applied to lead 27 was of such polarity to set the core F to the "0" state, then the pulse appplied by lead 28 driving the core F to the zero state would therefore have no switching effect, and no output would appear on line 29. In a fuze application the selection lead 27 may communicate with the outside of a missile, so that before firing selection between alternate modes of operation maybe made simply, electronically, and without moving parts.

The mode selection unit 13 provides for either a time signal function or an environmental signal function. If the environmental signal function has been chosen, the uit also provides for a time signal function in the event of malfunction of the environmental signal generator, or time signal operation in the event the environmental signal is too early. The mode selection unit 13 has four bistable cores G, H, I, and J. The core G has an input lead 36, connected to transfer lead 24 of counter 11, a second input lead 37, and an output lead 38. Lead 37 is connected to a core driver circuit 39 which is controlled by the environmental signal generator 14. Lead 37 also serves as an input to the core which has an additional input lead 41 connected to transfer lead 25 of counter 11, and another input lead 42 connected to core driver 43. Core driver 43 is connected to environmental signal generator 14 by lead 44, and is operated by a signal developed in environmental signal generator 14 in the event of a malfunction. The output of core H is taken over lead 45 which controls a core driver circuit 46.

The initial selection between a time signal function or an environmental signal function is made by means of selection cores I and J. The core I has an input lead 26, a selection input lead 47, and an output lead 48. The core J has input leads 38, 49, a selection input lead 51, and an output lead 52. The selection between time and environmental operation depends upon the character of the inputs on leads 47 and 51. Leads 47 and 51 are ganged together so that the input to one will always be the negative of the other. That is, if core I is driven to the "1" state by input on selection lead 47, core J will be driven to the "0" state by input on selection lead 51 and vice-sersa.

If time signal operation is desired the pulse applied to lead 47 is of such polarity as to drive core I to the "1" state of saturation and, therefore, the core J is driven to the "0" state of saturation by the pulse applied on lead 51. It should be observed, that since the "0" state of saturation has been preselected for core J, and all the inputs tend to switch core J into the "0" state of saturation, no output pulse will be developed by core J. In this time signal operation, after timer 21 has switched core A from the "0" to the "1" state and the "1" has been transferred through the cores A to E, an output pulse appears on lead 26 which switches core I from the "1" state, to which it has been previously set by an impulse on lead 47, to the "0" state. The switching of core I from the "1" to the "0" state produces an output on lead 48 which is connected to a driver circuit 53 which operates a load circuit indicated at 54, which controls the fuze detonation.

When environmental signal operation is desired core I is preset to the "0" state, and core J is preset to the "1" state of saturation. It will be noted as the explanation develops that any environmental signal arriving before a time determined by timer 21 and cores A through E will be treated as a false signal, and a mode of operation will automatically switch to time signal operation. Additionally, if a malfunction signal is received over lead 44 at any time the mode of operation will also automatically be swtiched to time signal operation.

In normal environmental signal operation timer 21 produces an output pulse and switches core A from the "0" to the "1" state of saturation. Each of the cores, B, C, D, and E of the counter 11 are thereafter successively switched to "1" and to "0." The output pulse appearing on lead 26 does not switch core I since it had been preset to the "0" state of saturation for proximity fuze operation. As core C of counter 11 is switched from the "1" to the "0" state, the pulse appearing on lead 24, conducted by lead 36, switches core G from the "0" to the "1" state. Core G, as were all the cores with the exception of selection cores I, J, and F, was preset to the "0" state before operation. Core G switching from the "0" to the "1" does not produce an output pulse on lead 38 of the polarity which will switch core J. Normally, this pulse will be blocked by a diode. When core D switches from the "1" to the "0" state the output pulse carried on lead 25 does not switch core H since core H was in the "0" state, and under normal conditions neither an environmental signal on lead 37 nor a malfunction signal on lead 42 will have been received at this time. After core G has been switched to the "1" state an environmental signal developed by enviromental signal generator 14 will trigger core driver 39 which will, over lead 37, switch core G from the "1" to the "0" state. Core G switching from the "1" to the "0" state will produce an output on lead 38 of such polarity as to switch core J from the "1" state, to which it had been preset, to the "0" state, producing an output on lead 52, which will trigger driver 53 to operate a load circuit 54. This is normal environmental signal operation.

An early signal from environmental signal generator 14, that is, one which occurs before the time determined fixed by timer 21 and cores A, B, C, is treated as a false signal. If the enviromental signal occurs before core C of counter 11 has switched from the "1" to "0" state operation is as follows. A one shot output of core driver 39 will be applied over lead 37 to cores G and H. The input to core G will have no switching effect since the core had been in the "0" state. The input to core H will switch that core to the "1" state. As indicated in FIG. 1, however, any output on lead 45 of core H will be blocked as the core switches from the "0" to the "1" state. With core H in the "1" state the unit 13 has been automatically changed to time signal mode of operation, with a function set to occur at time T minus 1, time T being the time of an output from core E. In this case, as the counter 11 counts past core D and core D switches from the "1" back to the "0" state, the output appearing on lead 25 switches, by means of lead 41, core H from the "1" to the "0" state. This produces an output on lead 45, which triggers core driver 46, producing an output on lead 49 which switches core J from the "1" state, to which it had been previously set, to "0" state. This produces an output on lead 52 triggering driver 53 which again operates a load circuit 54.

A signal on line 44, which tells of a malfunction, operates to automatically switch to time signal mode of operation in a manner similar to that of an early enviromental signal.

A signal, which indicates a malfunction of environmental signal generator 14, operates core driver 43 which in turn switches core H from the "0" to "1" state. Under these circumstances, similar to these of an early environmental signal, when core D of counter 11 switches from "1" to "0" this switches core H back to the "0" state, with a resultant output on lead 45. This output operates core driver 46 which again switches core J from the "1" to the "0" state of saturation. Core J switching from the "1" to the "0" state produces an output on lead 52 which operates a driver circuit 53 to control the load 54.

Figures 2, 3:
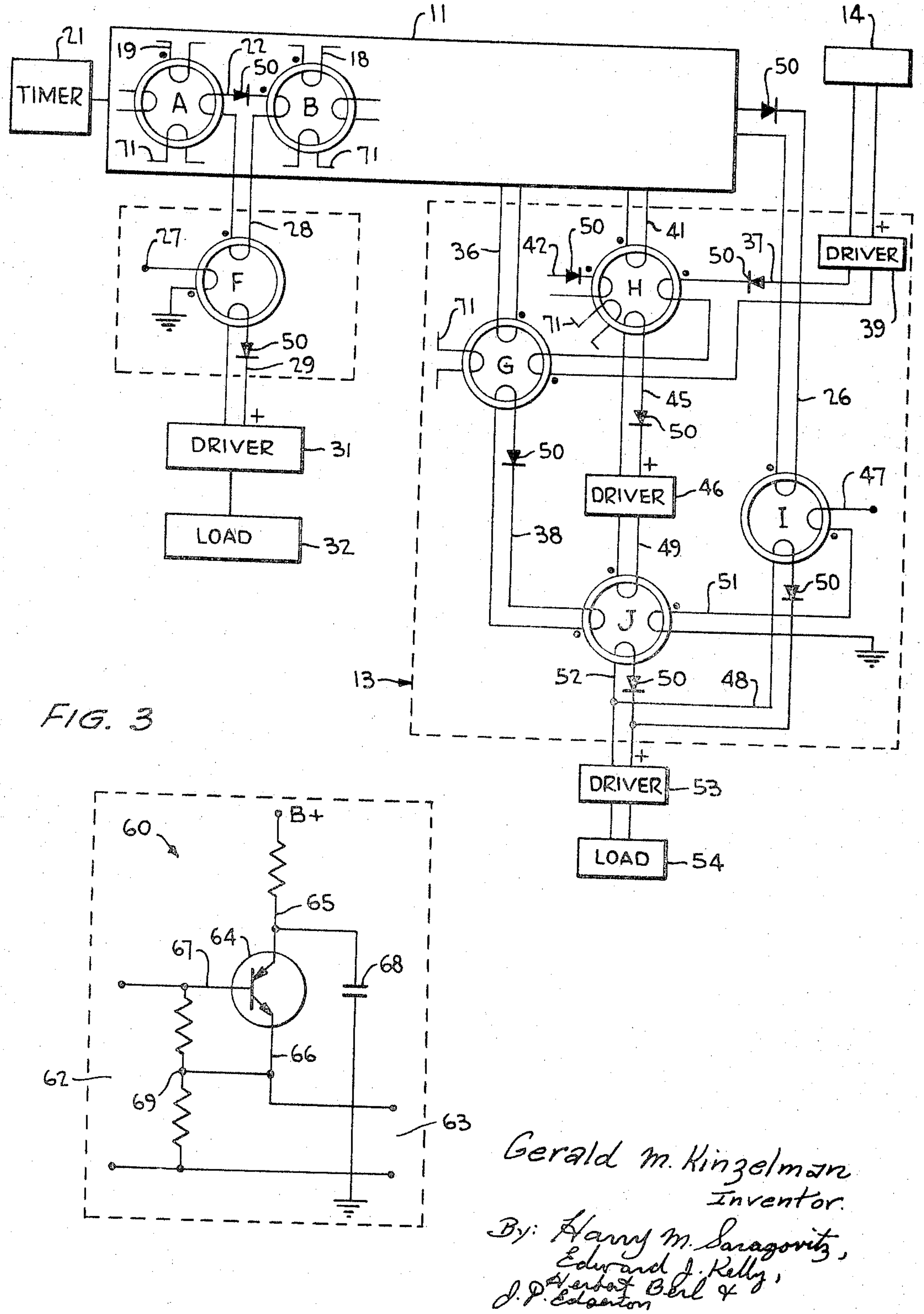
FIG. 2 is a schematic diagram of the logic circuit of FIG. 1.
FIG. 3 is a schematic diagram of one form of core driver circuit which may be used with this invention.

In FIG. 2 there is shown a partial schematic diagram of a specific embodiment of the invention described in FIG. 1. The same reference numeral have been used to identify like parts in FIGS. 1 and 2. A dot notation convention has been used in FIG. 2. That is, current flow in the direction of the dot side of the winding will tend to drive the core to the "1" state of saturation, and current flow into the non-dot side of the winding will tend to drive the core to the "0" state of saturation. Reverse switching of the cores is prevented by means of diodes 50, as is well known in the art. Initially each of the cores with the exception of the selection cores F, J, and I are set to "0" by a zero set winding 71.

Only the cores A and B of the counter 11 have been shown, since successive cores are identical and are well known in the art. Core F of selection unit 12 is shown connected in series between the cores A and B. Similarly, cores G and H are connected in series between cores C and D and D and E respectively.

Core F of selection unit 12 is a magnetic core having two stable states of saturation as previously described. An input on lead 27 may be of either polarity and therefore drive core F to either of its two stable states. Once the core has been set in either of its stable states it will remain in that state passively, that is, without any need for the application of power. If core F has been set to the "0" state by an input on lead 27, a subsequent input on lead 28 will have no switching effect since it will also tend to drive the core to the "0" state. False switching is prevented by diode 50. If the core F has been set to the "1" state the pulse produced when core A switches from "1" to "0" will switch core F producing an output on lead 29, which triggers a driver unit 31.

The mode selection unit 13 has a pair of selection cores I and J. As is shown in FIG. 2, the leads 47 and 51 are connected in series and are wound oppositely on the cores I and J. Therefore, core I will necessarily be set to the opposite state of core J. That is, if core I is set to the "0" state, core J will be set to the "1" state and vice-versa. The remainder of the mode selection unit 13 is believed to be adequately explained in connection with FIG. 1 and further explanation would appear repetitious.

FIG. 3 shows a drive unit well suited for use in the practice of this invention. In this circuit a short duration input pulse applied at 62 produces an output pulse of desired magnitude and duration at output 63. The driver circuit 60 is comprised of a silicon controlled rectifier 64 which is a semi-conductor device having a characteristic similar to a thyratron. The silicon controlled rectifier 64 has an anode electrode 65, a collector electrode 66, and a gate 67. When cut off, conduction through the silicon controlled rectifier is initiated by a short duration pulse applied to the gate 67. Once initiated, current through the silicone controlled rectifier 64 continues, independent of the control electrode signal, until the potential of the anode 65 falls below a predetermined value. The time of conduction is, therefore, controlled by the discharge characteristic of capacitor 68.

It will be apparent that the embodiments shown are only exemplary and that various modifications can be made in construction and arrangement within the scope of the invention as defined in the appended claims.

I claim as my invention:

1. A multi-mode fuze circuit which permits selection between time signal function and environmental signal function and which switches to a time signal function when an environmental signal function has been selected but the environmental signal occurs before a predetermined time, comprising:

(a) Timing means to produce a series of timing pulses, (b) a mode seletcion unit connected to said timing means, said mode selection unit comprising a time signal function selection device adapted to receive an output from said timing means, an environmental condition responsive signal source, an environmental signal function selection device, first means adapted to be activated by said timing means to make said first means responsive to an environmental signal from said source, second means activated by a premature or erroneous environmental signal to make said second means responsive to a timing pulse, and input means connecting said environmental condition responsive signal source to said first means and said second means, (c) a load circuit connected through said time signal function selection device to said timing means whereby said time signal function selection device may be placed in a condition that will allow an output of said timing means to pass to said load circuit, said load circuit being connected also through said environmental signal function selection device to said first means and said second means whereby said load will receive a signal from said first means if said first means has been activated by said timing means and has received a signal from said environmental condition responsive signal source, or said load will receive a signal from said second means in response to a predetermined state of said timing means if said environmental condition responsive signal source has emitted a signal as a result of a malfunction or prior to the time when said first means is activated by said timing means.

2. A multi-mode fuze circuit as in claim 1 wherein said time signal function and said environmental signal function selection devices are bi-stable magnetic core devices, the state of saturation of one device always being the opposite of the other.

3. A multi-mode fuze circuit as in claim 2 wherein said bi-stable core devices each have a selection input winding, said windings being connected in series and the winding on one core being wound oppositely to the winding on the other core, whereby selection of the mode of operation may be made electrically, and without moving parts.

4. A fuze circuit which allows for time signal function in the event of an early environmental signal comprising:

(a) A bi-stable counter circuit wherein there are a plurality of bi-stable elements which are switched successively, each element producing an output pulse as it is switched, (b) Means to generate an environmental signal connected to a first means which is also connected to said bi-stable counter circuit, said first means being activated by an output from said counter circuit to make it responsive to an environmental signal, (c) Second means also connected to said environmental signal generator and said counter circuit, said second means being activated by an environmental signal to make it responsive to an output from said counter, (d) Said first and second means having an output connected to a load circuit which controls detonation of the fuze.

5. A fuze circuit as in claim 4 wherein said first and second means are bi-stable magnetic cores.

References Cited

UNITED STATES PATENTS

| | | | |
|---|---|---|---|
| 2,846,667 | 8/1958 | Goodell | 307—88 |
| 2,889,542 | 6/1959 | Goldner | 307—88 |
| 2,905,833 | 9/1959 | Miehle | 307—88 |
| 3,044,044 | 7/1962 | Lee | 307—88 |
| 3,075,183 | 1/1963 | Warman | 340—174 |
| 3,264,487 | 8/1966 | Smith | 307—88 |

BERNARD KONICK, *Primary Examiner.*

M. S. GITTES, *Assistant Examiner.*